(12) United States Patent
Saeki

(10) Patent No.: US 10,363,973 B2
(45) Date of Patent: Jul. 30, 2019

(54) VEHICLE FRAMEWORK STRUCTURE

(71) Applicant: TOYOTA JIDOSHA KABUSHIKI KAISHA, Toyota-shi (JP)

(72) Inventor: Koji Saeki, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 17 days.

(21) Appl. No.: 15/855,925

(22) Filed: Dec. 27, 2017

(65) Prior Publication Data

US 2018/0118277 A1    May 3, 2018

Related U.S. Application Data

(63) Continuation of application No. 15/273,244, filed on Sep. 22, 2016, now Pat. No. 9,884,657.

(30) Foreign Application Priority Data

Sep. 28, 2015   (JP) .................................. 2015-190076

(51) Int. Cl.
  *B60N 99/00* (2006.01)
  *B62D 25/20* (2006.01)
  *B62D 21/03* (2006.01)

(52) U.S. Cl.
  CPC ......... *B62D 25/2018* (2013.01); *B62D 21/03* (2013.01); *B62D 25/20* (2013.01); *B62D 25/2027* (2013.01); *B62D 25/2036* (2013.01)

(58) Field of Classification Search
  CPC .... B62D 25/2018; B62D 21/03; B62D 25/20; B62D 25/2027; B62D 25/2036
  See application file for complete search history.

(56) References Cited

U.S. PATENT DOCUMENTS

| 4,557,519 | A | 12/1985 | Matsuura |
| 7,731,274 | B2 | 6/2010 | Kishima et al. |
| 9,073,578 | B2 | 7/2015 | Chikazawa |
| 2004/0140693 | A1 | 7/2004 | Gibbianelli et al. |
| 2012/0021301 | A1* | 1/2012 | Ohashi ..................... B60K 1/04 429/400 |
| 2014/0183905 | A1* | 7/2014 | Chikazawa .......... B62D 21/155 296/187.08 |
| 2014/0232141 | A1 | 8/2014 | Mochizuki |

FOREIGN PATENT DOCUMENTS

| FR | 1.197.349 A | 11/1959 |
| JP | 2000-211555 A | 8/2000 |
| JP | 2010-179897 A | 8/2010 |
| JP | 2010-179898 A | 8/2010 |
| JP | 2012-011857 A1 | 1/2012 |
| JP | 2016-168923 | 9/2016 |

* cited by examiner

*Primary Examiner* — Lori L Lyjak
(74) *Attorney, Agent, or Firm* — Oblon, McClelland, Maier & Neustadt, L.L.P.

(57) ABSTRACT

A vehicle framework structure includes a tunnel disposed in a central part of a floor panel of a vehicle in a vehicle width direction so as to extend in a vehicle front-rear direction, a pair of rockers, a floor lower cross structure, and a floor frame. A front end of the floor frame in the vehicle front-rear direction is connected to a front side structure provided in a vehicle front part so as to be disposed between one of the rockers and the tunnel in the vehicle width direction and to extend along the vehicle front-rear direction, and a rear end of the floor frame is connected to the one of the rockers and the floor lower cross structure.

10 Claims, 7 Drawing Sheets

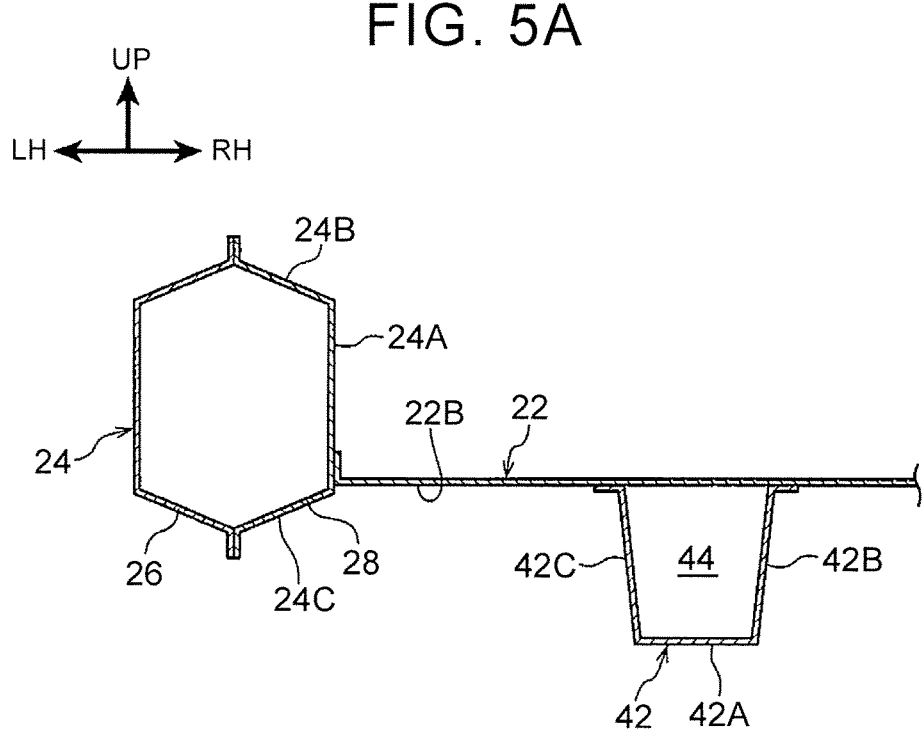
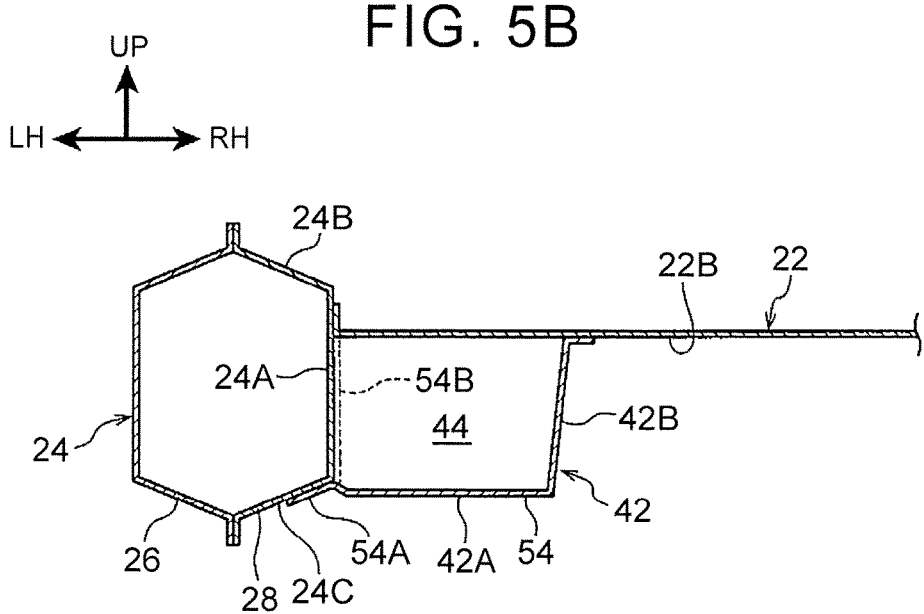

VEHICLE FRAMEWORK STRUCTURE

CROSS-REFERENCE TO RELATED APPLICATIONS

This application is a continuation of U.S. application Ser. No. 15/273,244, flied Sep. 22, 2016, which is based upon and claims the benefit of priority from Japanese Patent Application No. 2015-190076, filed on Sep. 28, 2015. The entire contents of each of the above applications are incorporated herein by reference in entirety.

BACKGROUND OF THE DISCLOSURE

1. Field of the Disclosure

The present application relates to a vehicle framework structure.

2. Description of Related Art

Japanese Patent Application Publication No. 2012-11857 (JP 2012-11857 A), for example, describes a technique in which a floor frame is provided between a rocker and a tunnel under a floor panel. The floor frame is inclined outward in a vehicle width direction as it goes toward a rear side in the vehicle front-rear direction. A front end of the floor frame is connected to a rear end of a front side frame, and a rear end of the floor frame is connected to a front end of a rear side frame. The rear side frame is configured such that an outer side, in the vehicle width direction, of a front part of the rear side frame is connected to a side sill (the rocker), and an inner side, in the vehicle width direction, of the front part of the rear side frame is connected to a cross member along the vehicle width direction. Hereby, at the time of a front part collision of a vehicle (a front collision of a vehicle), for example, it is possible to directly transmit a collision load input from a front frame to the rear side frame via the floor frame.

However, in recent years, vehicles have required further high rigidity with respect to a collision load input along the vehicle front-rear direction. On this account, there is room for further improvement in the above related technique.

SUMMARY

The present disclosure provides a vehicle framework structure that can obtain further high rigidity with respect to a collision load input from a vehicle front side.

A vehicle framework structure according to an aspect of the present disclosure includes: a tunnel disposed in a central part of a floor panel of a vehicle in a vehicle width direction so as to extend in a vehicle front-rear direction; a pair of rockers disposed on respective outer sides of the floor panel in the vehicle width direction so as to extend in the vehicle front-rear direction; a floor lower cross structure forming a first closed section with a bottom face of the floor panel, the floor lower cross structure being disposed along the vehicle width direction; and a floor frame forming a second closed section with the bottom face of the floor panel, the floor frame being disposed between one of the rockers and the tunnel along the vehicle front-rear direction. A front end of the floor frame in the vehicle front-rear direction is connected to a front side structure provided in a vehicle front part so as to be disposed between the one of the rockers and the tunnel in the vehicle width direction and to extend along the vehicle front-rear direction, and a rear end of the floor frame in the vehicle front-rear direction is connected to the one of the rockers and the floor lower cross structure.

According to the aspect, strength and rigidity of the floor frame, the one of the rockers, and the floor lower cross structure, which are so-called frame structures, are further improved. As a result, it is possible to improve strength and rigidity of the floor panel itself.

The vehicle framework structure of the above aspect may further include a cross structure disposed along the vehicle width direction, the cross structure being connected to a front part of the floor frame in the vehicle front-rear direction and the one of the rockers, and the floor frame may be placed so as to be inclined outward in the vehicle width direction as it goes toward a rear side in the vehicle front-rear direction in a bottom view.

According to the above aspect, a framework having a so-called triangle-shaped truss structure is formed between the cross structure, the floor frame, and the one of the rockers in the bottom view, thereby making it possible to further improve the strength and rigidity of the floor panel itself.

The vehicle framework structure of the above aspect may further include a rear side structure disposed on an outer side of a vehicle rear part in the vehicle width direction, the rear side structure forming a third closed section with the bottom face of the floor panel and extending in the vehicle front-rear direction, and a front part of the rear side structure in the vehicle front-rear direction and a rear part of the floor frame in the vehicle front-rear direction may be placed at the same position in the vehicle width direction.

According to the above aspect, since the front part of the rear side structure and the rear part of the floor frame are placed at the same position in the vehicle width direction, it is possible to transmit (disperse), to the rear side structure, a collision load transmitted from the floor frame. Further, it is possible to transmit, to the floor frame, a collision load transmitted from the rear side structure. That is, it is possible to effectively transmit a collision load input into the vehicle, along the vehicle front-rear direction via the floor frame and the rear side structure.

In the vehicle framework structure in the aspect, the floor panel may be inclined upward in a vehicle up-down direction as it goes from a front side of the one of the rockers in the vehicle front-rear direction toward a floor-lower-cross-structure side along the vehicle front-rear direction in a side view.

According to the above aspect, it is possible to widen a space with respect to grounding points of tires on the floor-lower-cross-structure side of the floor panel. This makes it possible to increase a height-direction dimension in the second closed section of the floor frame.

The vehicle framework structure according to the above aspect may further include a floor upper cross structure opposed to the floor lower cross structure with the floor panel being provided between the floor upper cross structure and the floor lower cross structure, the floor upper cross structure forming a fourth closed section with a top face of the floor panel so as to overlap with the first closed section of the floor lower cross structure in a vehicle up-down direction, the floor upper cross structure being disposed along the vehicle width direction so as to be connected to the pair of rockers.

The vehicle framework structure according to the above aspect further includes, on the floor panel, the floor upper cross structure opposed to the floor lower cross structure with the floor panel being provided therebetween, and the floor upper cross structure is disposed along the vehicle width direction so as to be connected to the pair of rockers. Further, the floor upper cross structure forms a fourth closed section with the top face of the floor panel, and overlaps, in the vehicle up-down direction, with the first closed section formed between the bottom face of the floor panel and the floor lower cross structure.

In the above aspect, the floor upper cross structure connected to the pair of rockers forms the fourth closed section with the floor panel, and the floor upper cross structure and the floor lower cross structure, which forms the first closed section with the floor panel, are disposed on top of each other in the vehicle up-down direction with the floor panel being provided therebetween. This makes it possible to improve the rigidity of the floor panel itself.

The vehicle framework structure according to the above aspect may be configured such that, inside the first closed section of the floor lower cross structure, a reinforcing structure is provided between a rear part of the floor frame in the vehicle front-rear direction and a front part of a rear side structure in the vehicle front-rear direction, the rear side structure being disposed on an outer side of a vehicle rear part in the vehicle width direction.

According to the above aspect, the rigidity of the floor lower cross structure itself improves.

In the above aspect, the reinforcing structure may include a vertical wall placed along the vehicle front-rear direction, and a first inner wall placed on an inner side of the floor frame in the vehicle width direction, the vertical wall, and a second inner wall placed on an inner side of the rear side structure in the vehicle width direction may be formed continuously along the vehicle front-rear direction in the bottom view.

According to the above embodiment, it is possible to efficiently transmit a collision load input into the vehicle, along the vehicle front-rear direction between the floor frame and the rear side structure.

The vehicle framework structure according to the above aspect may be configured such that: a rear part of the floor frame in the vehicle front-rear direction includes a widened structure including a width dimension along the vehicle width direction that is increased to be wider than another part of the floor frame in the vehicle front-rear direction; an outer flange is provided in an outer end of the widened structure in the vehicle width direction; the outer flange is connected to the one of the rockers; a rear flange is provided in a rear end of the widened structure in the vehicle front-rear direction; and the rear flange is connected to the floor lower cross structure.

According to the above aspect, since the floor frame is increased in width, it is possible to further disperse an impact load input into the front part of the floor frame by just that much, thereby making it possible to improve load transmission efficiency.

Further, according to the above aspect, in the floor frame, parts (the flanges) to be connected to the one of the rockers and the floor lower cross structure are formed in the widened structure, thereby making it possible to increase a connection area with respect to the one of the rockers and the floor lower cross structure. This makes it possible to increase bonding strength of the floor frame with the one of the rockers and the floor lower cross structure by just that much.

As described above, the vehicle framework structure according to the above aspect has an excellent effect to yield further high rigidity with respect to a collision load input into the vehicle from the vehicle front side.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5A is a sectional view taken along a line VA-VA in FIG. 1;

FIG. 5B is a sectional view taken along a line VB-VB in FIG. 1;

DETAILED DESCRIPTION OF EMBODIMENTS

The following describes a vehicle framework structure according to an embodiment of the present disclosure with reference to the drawings. Note that an arrow FR, an arrow UP, an arrow RH, and an arrow LH described appropriately in each figure indicate a front direction, an upper direction, a right direction, and a left direction of a vehicle to which a vehicle framework structure 10 according to an embodiment is applied. Hereinafter, in a case where a description is made by use of merely directions of front/rear, up/down, and right/left, they indicate front/rear of a vehicle front-rear direction, up/down of a vehicle up-down direction, and right/left in a case of facing forward, unless otherwise specified.

(Configuration of Vehicle Framework Structure) Initially, described is a configuration of a vehicle framework structure according to the present embodiment.

Figure 1:
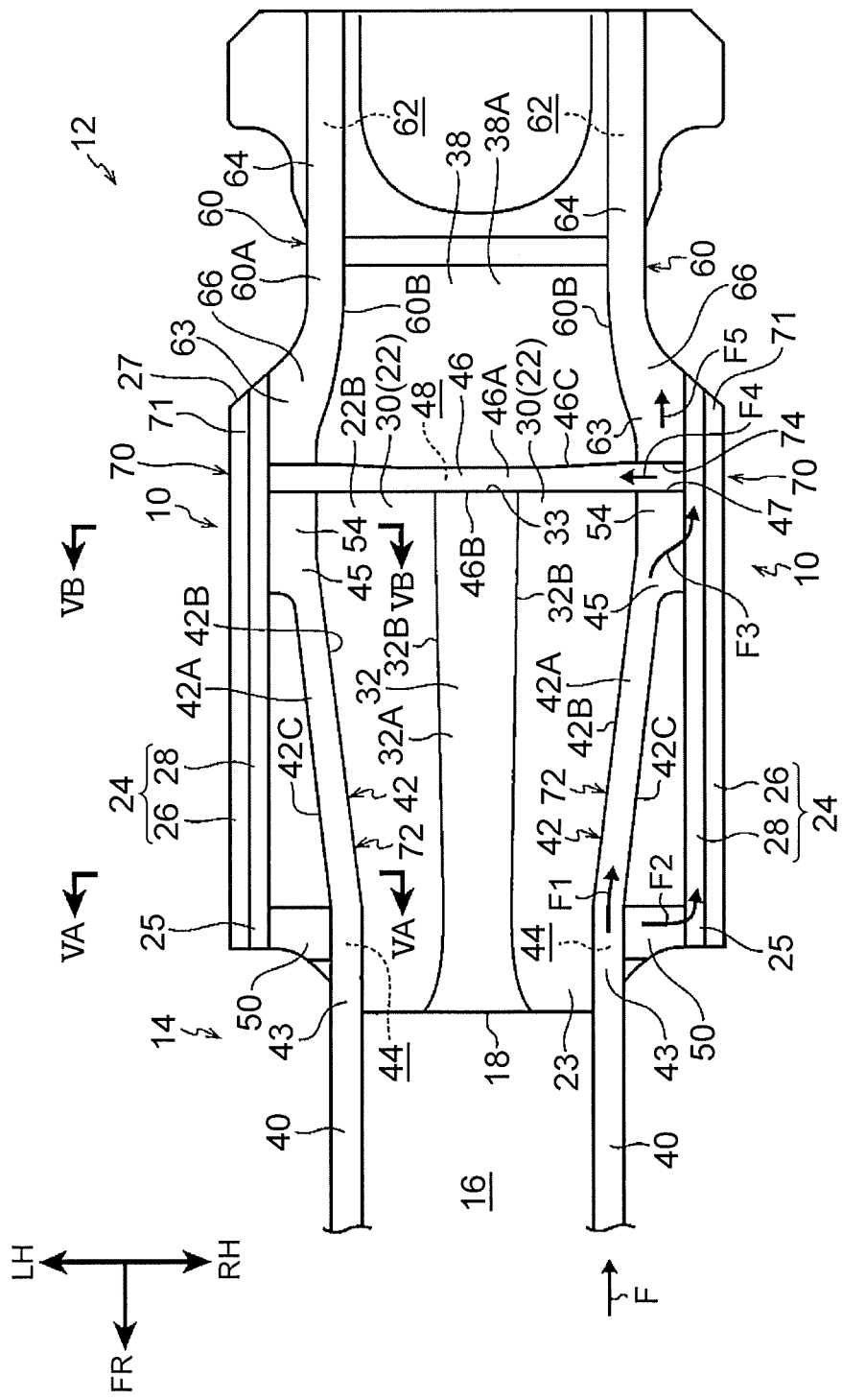
FIG. 1 is a bottom view illustrating a vehicle framework structure according to the present embodiment.
Figure 6:
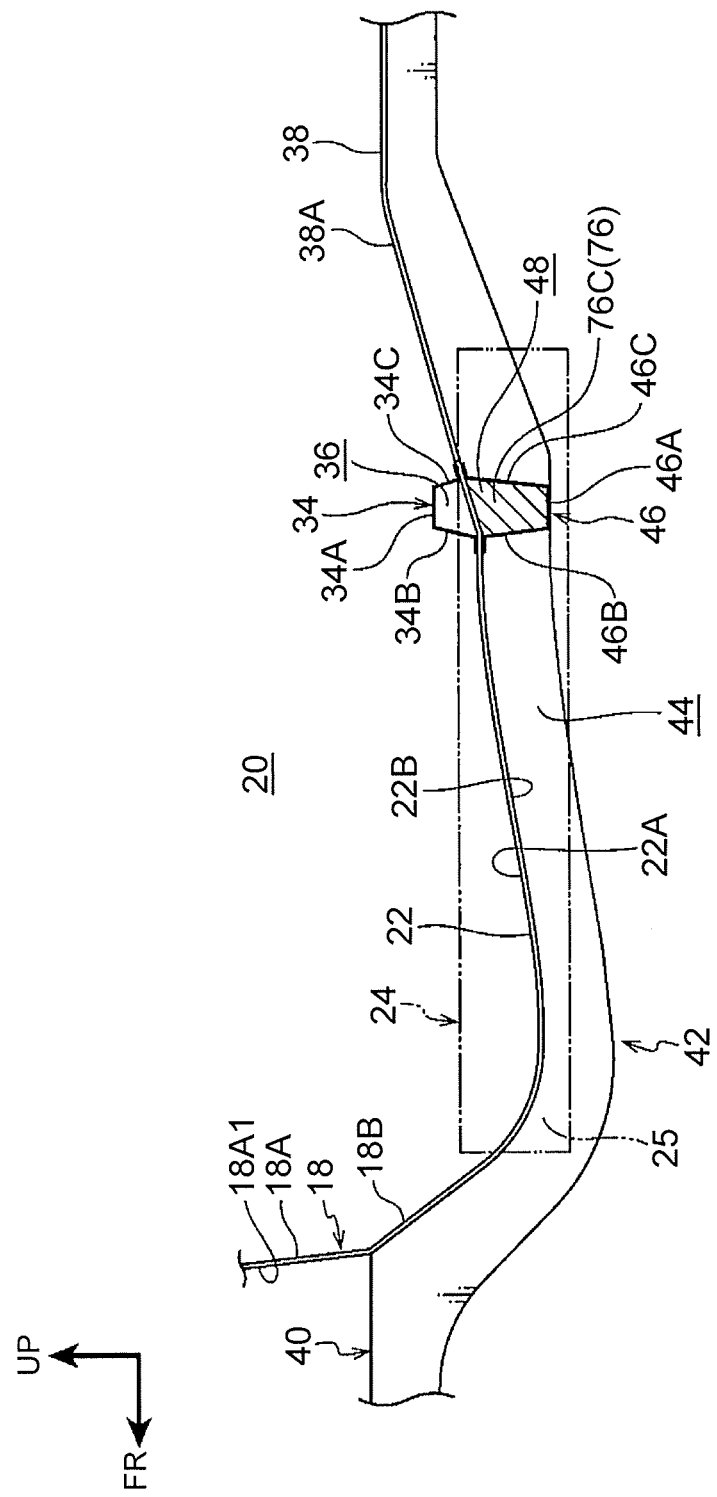
FIG. 6 is a sectional view illustrating a modification of the vehicle framework structure of the present embodiment, along an extending direction of a floor frame.

FIG. 1 illustrates a vehicle (a vehicle body) 12 to which a vehicle framework structure 10 according to the present embodiment is applied. Generally, a vehicle front portion 14 of the vehicle 12 is provided with a power unit room 16. The power unit room 16 is separated from a passenger compartment 20 (see FIG. 6) by a dash panel 18. As illustrated in FIG. 6, an upper part 18A of the dash panel 18 is formed along the vehicle up-down direction and a lower part 18B thereof is formed to be inclined downward when going toward a rear side.

A front end of a floor panel 22 constituting a floor of the passenger compartment 20 is connected to a bottom end of the dash panel 18, so that the dash panel 18 is integrated with the floor panel 22. Note that the connection in the present embodiment may be welding by spot welding or the like, for example. Further, the dash panel 18 and the floor panel 22 may be formed in an integrated manner.

As illustrated in FIG. 1, respective rockers 24 are provided on both sides of the floor panel 22 in the vehicle width direction so as to extend along the vehicle front-rear direction. The rocker 24 is constituted by a rocker outer panel 26 disposed on an outer side in the vehicle width direction, and a rocker inner panel 28 disposed on an inner side in the vehicle width direction.

Further, as illustrated in FIG. 5A, sectional shapes of the rocker outer panel 26 and the rocker inner panel 28 when cut along the vehicle width direction are generally hat shapes that are opened on sides facing each other. The rocker outer panel 26 and the rocker inner panel 28 include: a side wall portion 24A placed along the vehicle up-down direction; and an upper wall portion 24B and a lower wall portion 24C respectively placed on an upper part and a lower part of the side wall portion 24A along the vehicle up-down direction.

Further, as illustrated in FIG. 1, the floor panel 22 is divided on right and left sides of the vehicle 12, and constituted by a pair of floor panels 30. A tunnel 32 extends along the vehicle front-rear direction in a central part (between the floor panel 30 and the floor panel 30) of the floor panel 22 in the vehicle width direction.

The tunnel 32 is configured such that its section taken along the vehicle width direction has a generally hat shape that is opened downward, and includes an upper wall portion 32A and a pair of side wall portions 32B placed on right and left sides of the upper wall portion 32A. Bottom ends of the side wall portions 32B are connected to the floor panel 22. Hereby, the floor panel 22 is integrated with the tunnel 32. Note that the floor panel 22 and the tunnel 32 may be formed in an integrated manner.

Further, the tunnel 32 has a shorter length in the vehicle front-rear direction than that of the rocker 24, and a rear end 33 of the tunnel 32 is placed on a front side relative to a rear end 27 of the rocker 24. A floor upper cross member 34 (shown in FIG. 6) is placed along the vehicle width direction and is connected to the rear end 33 of the tunnel 32.

The floor upper cross member 34 is configured such that its sectional shape along the vehicle front-rear direction is a so-called generally hat shape having an opening on a lower side. Further, the floor upper cross member 34 includes an upper wall portion 34A placed so as to be opposed to a top face 22A of the floor panel 22, and a front wall portion 34B and a rear wall portion 34C connected to the upper wall portion 34A and opposed to each other.

The front wall portion 34B of the floor upper cross member 34 is connected to the rear end 33 of the tunnel 32. Further, both ends of the floor upper cross member 34 in the vehicle width direction are connected to the pair of rockers 24, respectively. Further, bottom ends of the front wall portion 34B and the rear wall portion 34C of the floor upper cross member 34 are connected to the top face 22A of the floor panel 22. In this state, a closed section portion (a fourth closed section portion) 36 is formed between the floor panel 22 and the floor upper cross member 34.

Further, as illustrated in FIG. 6, a rear floor panel 38 extended in the vehicle width direction and in the vehicle front-rear direction is provided on a rear side of the floor upper cross member 34. The rear floor panel 38 constitutes a part of the floor panel 22. Note that the rear floor panel 38 and the floor panel 22 may be formed in an 5 integrated manner or may be integrated by being connected to each other.

Further, as illustrated in FIG. 1, a pair of front side members 40 are placed on respective outer sides, in the vehicle width direction, of the power unit room 16 of the vehicle front portion 14, that is, each of the front side members 40 is placed between the tunnel 32 and a corresponding one of the rockers 24 in the vehicle width direction. The front side members 40 extend along the vehicle front-rear direction, and their sections taken along the vehicle width direction have a generally rectangular shape.

As illustrated in FIG. 6, the front side member 40 is connected to a front surface 18A1 of the upper part 18A of the dash panel 18 and is inclined along a shape of the lower part 18B of the dash panel 18 so as to further extend toward a bottom-face-22B side of the floor panel 22. In the following description, a part of the front side member 40 up to the upper part 18A of the dash panel 18 is referred to as the front side member 40, and a part on the rear side relative to the upper part 18A of the dash panel 18 is referred to as a floor frame 42.

As illustrated in FIGS. 5A, 5B, the floor frame 42 is configured such that its sectional shape along the vehicle width direction is a generally hat shape having an opening on the upper side. The floor frame 42 includes a lower wall portion 42A placed so as to be opposed to the bottom face 22B of the floor panel 22, and a pair of side wall portions 42B, 42C connected to the lower wall portion 42A and opposed to each other. Note that, in the pair of side wall portions 42B, 42C, a wall portion placed on a tunnel-32 side is referred to as an inner wall portion (a first inner wall portion) 42B, and a wall portion placed on a rocker-24 side is referred to as an outer wall portion 42C. Upper ends of the inner wall portion 42B and the outer wall portion 42C are connected to the bottom face 22B of the floor panel 22. In this state, a closed section portion (a second closed section portion) 44 is formed between the floor frame 42 and the floor panel 22.

Here, as illustrated in FIGS. 1 and 6, a floor lower cross member 46 is connected to the bottom face 22B of the floor panel 22 along the vehicle width direction, so as to be opposed to the floor upper cross member 34 with the floor panel 22 being provided therebetween. The floor lower cross member 46 is configured such that its sectional shape along the vehicle front-rear direction is a generally reversed hat shape having an opening on an upper side. The floor lower cross member 46 includes a lower wall portion 46A placed so as to be opposed to the bottom face 22B of the floor panel 22, and a front wall portion 46B and a rear wall portion 46C connected to the lower wall portion 46A and opposed to each other.

Further, both ends of the floor lower cross member 46 in the vehicle width direction are connected to the pair of rockers 24, respectively. Further, upper ends of the front wall portion 46B and the rear wall portion 46C of the floor lower cross member 46 are connected to the bottom face 22B of the floor panel 22. In this state, a closed section portion (a first closed section portion) 48 is formed between the floor lower cross member 46 and the floor panel 22. The closed section portion 48 overlaps with the closed section portion 36 of the floor upper cross member 34 in the up-down direction with the floor panel 22 being provided therebetween.

Further, as illustrated in FIG. 1, the floor frame 42 is inclined outward in the vehicle width direction when going toward the rear side, when viewed in a bottom view. A torque box 50 as a cross member is connected, along the vehicle width direction, to a front part 43 of the floor frame 42 (a front-side-member-40 side of the floor frame 42) placed in a front part 23 of the floor panel 22 (a dash-panel-18 side of the floor panel 22).

Figure 2:
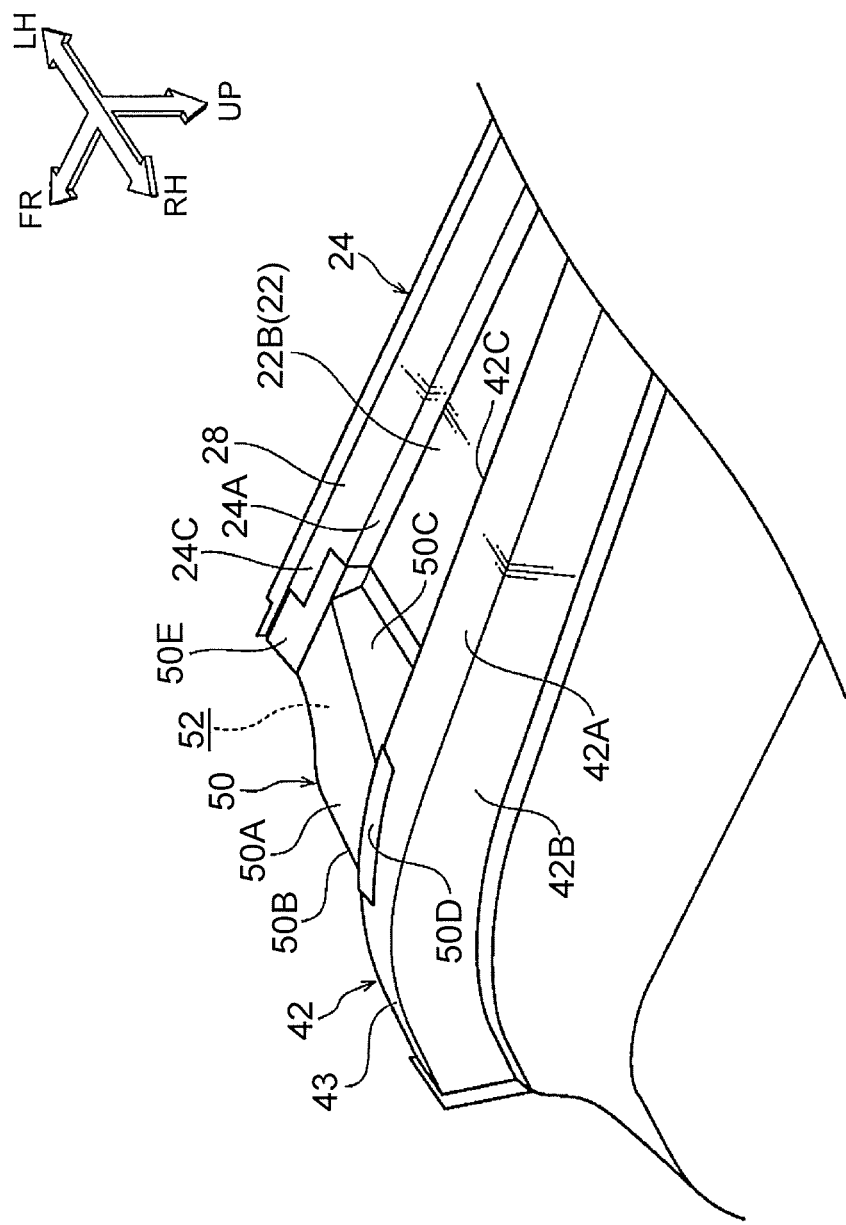
FIG. 2 is a perspective view illustrating a configuration on a front side, in a vehicle front-rear direction, of the vehicle framework structure according to the present embodiment, when viewed from a diagonally right rear side on a vehicle bottom side.

As illustrated in FIG. 2, the torque box 50 is configured such that its sectional shape along the vehicle front-rear direction is a generally reversed hat shape having an opening on the upper side. The torque box 50 includes a lower wall portion 50A placed so as to be opposed to the bottom face 22B of the floor panel 22, and a front wall portion 50B and a rear wall portion 50C connected to the lower wall portion 50A and opposed to each other.

Upper ends of the front wall portion 50B and the rear wall portion 50C are connected to the bottom face 22B of the floor panel 22, so that a closed section portion 52 is formed between the torque box 50 and the floor panel 22. A flange portion 50D formed in one end of the torque box 50 in the vehicle width direction is connected to the lower wall portion 42A and the outer wall portion 42C of the floor frame 42, and a flange portion 50E formed in the other end of the torque box 50 in the vehicle width direction is connected to the lower wall portion 24C and the side wall portion 24A of the rocker inner panel 28 of the rocker 24.

Figure 3:
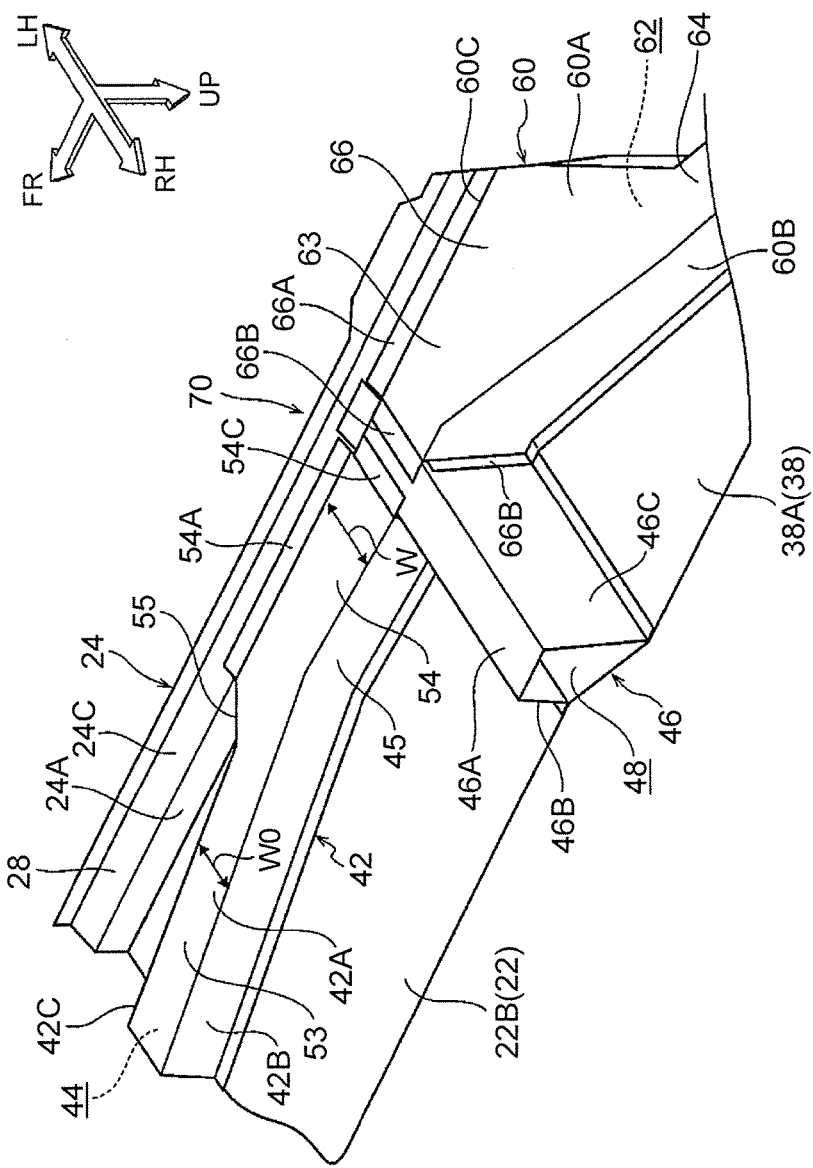
FIG. 3 is a perspective view illustrating a configuration on a rear side, in the vehicle front-rear direction, of the vehicle framework structure according to the present embodiment, when viewed from the diagonally right rear side on the vehicle bottom side.

In the meantime, as illustrated in FIGS. 1 and 3, a rear part 45 of the floor frame 42 is connected to the rocker 24 and the floor lower cross member 46. More specifically, the rear part 45 of the floor frame 42 is a widened portion 54 in which a width dimension W of the lower wall portion 42A along the vehicle width direction is increased to be wider than a width dimension W0 of a general portion (the other part of the floor frame along the vehicle width direction) 53. Further, an outer side of the widened portion 54 in the vehicle width direction is formed so as to be generally parallel to the rocker 24. Further, the outer wall portion 42C on the rocker-24 side is not provided in the widened portion 54, and an outer flange portion 54A extends outward in the vehicle width direction from the lower wall portion 42A. The outer flange portion 54A is connected to the lower wall portion 24C of the rocker inner panel 28 of the rocker 24.

Further, the outer wall portion 42C of the general portion 53 of the floor frame 42 is connected to a front part 55 of the widened portion 54, and an outer flange portion 54B (see FIG. 5B) formed in a rear part of the outer wall portion 42C is connected to the side wall portion 24A of the rocker inner panel 28. Further, a rear flange portion 54C extends from a rear end of the widened portion 54, and is connected to the lower wall portion 46A and the front wall portion 46B of the floor lower cross member 46.

Further, as described above, the rear floor panel 38 is provided on the rear side relative to the floor lower cross member 46. A pair of rear side members 60 are disposed along the vehicle front-rear direction on respective outer sides of the rear floor panel 38 in the vehicle width direction. The rear side member 60 is configured such that its sectional shape along the vehicle width direction is a so-called generally reversed hat shape having an opening on the upper side. The rear side member 60 includes a lower wall portion 60A placed so as to be opposed to a bottom face 38A of the rear floor panel 38, and a pair of side wall portions 60B, 60C connected to the lower wall portion 60A and opposed to each other.

Note that, in the pair of side wall portions 60B, 60C, a wall portion placed on a tunnel-32 side is referred to as an inner wall portion (a second inner wall portion) 60B, and a wall portion placed on a rocker-24 side is referred to as an outer wall portion 60C. Upper ends of the inner wall portion 60B and the outer wall portion 60C are connected to the bottom face 22B of the floor panel 22. In this state, a closed section portion 62 is formed between the rear side member 60 and the floor panel 22.

Further, a front-part-63 side of the rear side member 60 is a widened portion 66 in which a width dimension W of the lower wall portion 60A along the vehicle width direction is increased to be wider than a general portion 64. An outer side of the widened portion 66 in the vehicle width direction is formed so as to be generally parallel to the rocker 24. Further, the side wall portion 60C on the rocker-24 side is not provided in the widened portion 66, and an outer flange portion 66A extends outward in the vehicle width direction from the lower wall portion 60A. The outer flange portion 66A is connected to the lower wall portion 24C of the rocker inner panel 28 of the rocker 24. Further, a front flange portion 66B extends from a front end of the widened portion 66, and the front flange portion 66B is connected to the lower wall portion 46A and the rear wall portion 46C of the floor lower cross member 46.

In this state, the widened portion 54 of the floor frame 42 and the widened portion 66 of the rear side member 60 are placed at the same position in the vehicle width direction. In other words, the widened portion 54 of the floor frame 42 and the widened portion 66 of the rear side member 60 are placed along the vehicle front-rear direction with the floor lower cross member 46 being provided therebetween. Note that the "same position" herein indicates that the widened portion 66 of the rear side member 60 and the widened portion 54 of the floor frame 42 should be placed so as to at least partially overlap each other in the vehicle width direction.

(Operations/Effects of Vehicle Framework Structure) The following describes operations/effects of the vehicle framework structure according to the present embodiment.

As illustrated in FIG. 1, in the present embodiment, the floor lower cross member 46 disposed on a rear-end-33 side of the tunnel 32 along the vehicle width direction is disposed so as to be opposed to the floor upper cross member 34 (see FIG. 6) connected to the pair of rockers 24 with the floor panel 22 being provided therebetween. The floor upper cross member 34 forms the closed section portion 36 (see FIG. 6) with the top face 22A of the floor panel 22, and the floor lower cross member 46 forms the closed section portion 48 (see FIG. 6) with the bottom face 22B of the floor panel 22.

Thus, the floor upper cross member 34 and the floor lower cross member 46 respectively form the closed section portions 36, 48 with the floor panel 22. This makes it possible to improve rigidity of the floor upper cross member 34 and the floor lower cross member 46 in comparison with a case where the closed section portions 36, 48 are not formed. Further, the floor upper cross member 34 overlaps with the floor lower cross member 46 in the up-down direction with the floor panel 22 being provided therebetween. This makes it possible to further improve the rigidity of the floor upper cross member 34 and the floor lower cross member 46.

Further, in the present embodiment, on the lower side relative to the floor panel 22, the floor frame 42 forming the closed section portion 44 with the bottom face 22B of the floor panel 22 is placed between the rocker 24 and the tunnel 32 in the vehicle front-rear direction. The front part 43 of the floor frame 42 is connected to the front side member 40, and the rear part 45 of the floor frame 42 is connected to the rocker 24 and the floor lower cross member 46.

Further, in the present embodiment, the widened portion 54 formed in the rear part 45 of the floor frame 42 and the widened portion 66 formed in the front part 63 of the rear side member 60 are placed at the same position in the vehicle width direction. The widened portion 66 of the rear side member 60 is connected to the rocker 24 and the floor lower cross member 46. That is, in the present embodiment, the rocker 24, the floor frame 42, the floor lower cross member 46, and the rear side member 60 are connected to each other at the same place (a connection portion 70).

Hereby, as illustrated in FIG. 1, according to the present embodiment, a collision load input into the front side member 40 is transmitted to the floor frame 42 (load: F1), with respect to a collision load F input into the vehicle 12 from a vehicle front side. Note that, at the front part 43 of the floor frame 42, the collision load F1 is dispersed toward the rocker-24 side through the torque box 50 (load: F2).

Figure 7A:
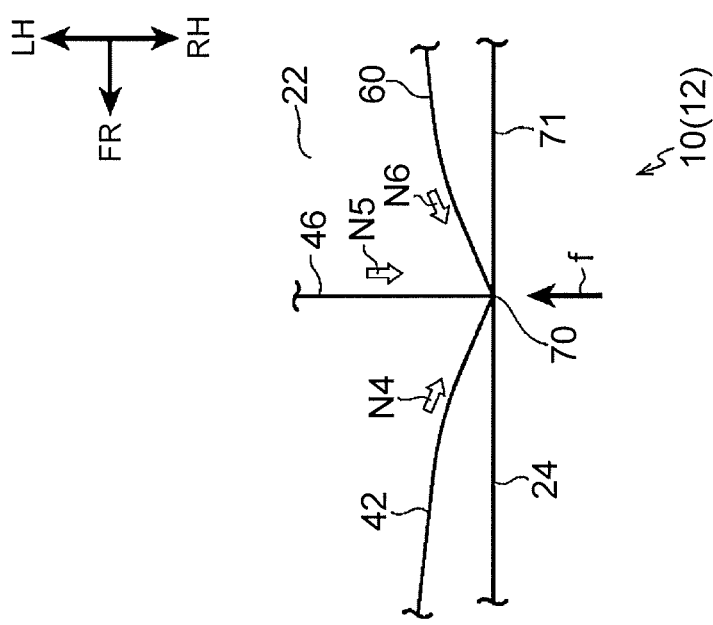
FIG. 7A is an explanatory view illustrating an operation of the vehicle framework structure according to the present embodiment.
Figure 7B:
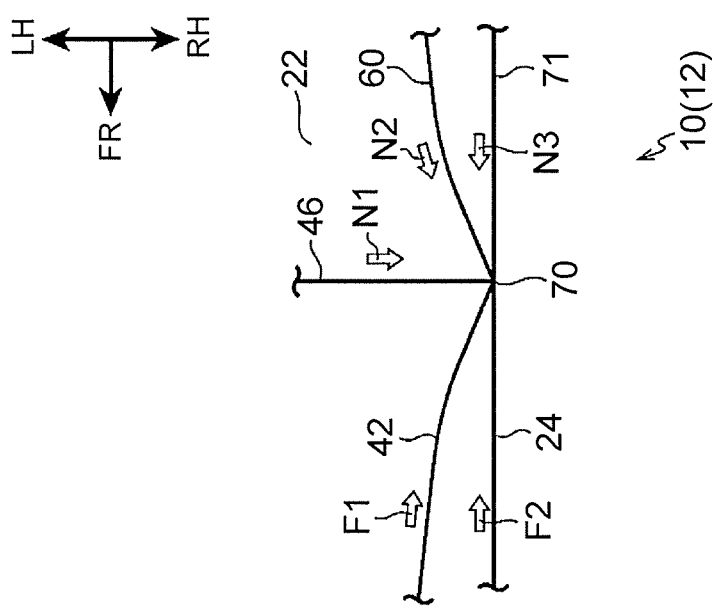
FIG. 7B is an explanatory view illustrating the operation of the vehicle framework structure according to the present embodiment.

Further, as illustrated in FIG. 7A, these loads are transmitted to the connection portion 70. At the connection portion 70, it is possible to obtain respective reaction forces (N1, N2, N3) from the floor lower cross member 46, the rear side member 60, and a rear part 71 of the rocker 24. Note that, as illustrated in FIG. 7B, with respect to a collision load f input into the vehicle 12 from a vehicle lateral side, it is possible to obtain, at the connection portion 70, respective reaction forces (N4, N5, N6) from the floor frame 42, the floor lower cross member 46, and the rear side member 60.

Thus, the floor frame 42, the rocker 24, the floor lower cross member 46, and the rear side member 60, which are so-called frame members, are connected to each other at one place, i.e., the connection portion 70. This increases a bonding strength of these members, thereby making it possible to further improve strength and rigidity of these members. As a result, it is possible to improve the rigidity of the floor panel 22 itself.

That is, according to the present embodiment, it is possible to obtain further high rigidity with respect to a collision load input into the vehicle 12 from the vehicle front side. For example, as illustrated in FIG. 1, the collision load F input into the front side member 40 is transmitted to the floor frame 42 (load: F1), at the time of a front collision of the vehicle 12. The floor frame 42 is connected to the rocker 24 and the floor lower cross member 46. Because of this, the load F1 transmitted to the floor frame 42 is transmitted to the rocker 24 (load: F2, F3), the floor lower cross member 46 (load: F4), and the rear side member 60 (load: F5) via the floor lower cross member 46.

That is, according to the present embodiment, it is possible to effectively transmit the collision load F along the vehicle front-rear direction via the floor frame 42 and the rear side member 60. Further, in the present embodiment, at the connection portion 70, the widened portion 66 is provided in the rear side member 60 and the widened portion 54 is provided in the floor frame 42.

When the widened portions 54, 66 are provided in the floor frame 42 as such, it is possible to increase a connection area (e.g., the outer flange portion 54A, the rear flange portion 54C, and the like as illustrated in FIG. 3) for connecting the rocker 24 to the floor lower cross member 46, in comparison with a case where the widened portions 54, 66 are not provided. This accordingly makes it possible to strengthen a bonding strength between the floor frame 42, the rear side member 60, the rocker 24, and the floor lower cross member 46. Further, the widened portions 54, 66 are provided in the floor frame 42 and the rear side member 60, respectively. This makes it possible to improve load transmission efficiency by further dispersing an impact load input into the floor frame 42 or the rear side member 60 by just that much, and load transmission efficiency can be improved.

Further, in the present embodiment, the front part 43 of the floor frame 42 is connected to the front part 25 of the rocker 24 via the torque box 50, and the rear part 45 of the floor frame 42 is connected to the rocker 24 and the floor lower cross member 46. That is, a framework portion 72 having a so-called truss structure is formed by the floor frame 42, the torque box 50, and the rocker 24 on either side of the floor panel 22 in the vehicle width direction in a bottom view. This makes it possible to further improve the rigidity of the floor panel 22 itself, thereby making it possible to improve so-called load transmission efficiency.

(Modification of Present Embodiment) Generally, a floor height of a vehicle varies depending on the type of the vehicle. For example, a floor height of a sedan type vehicle (low floor) is low in comparison with an SUV (Sport Utility Vehicle) vehicle (middle floor). Further, generally, a front part of a floor panel is inclined upward when going toward a front side of the floor panel, and a rear part of the floor panel is lower than the front part of the floor panel. On this account, in a case of a low-floor vehicle, if a frame member is disposed on the lower side relative to the floor panel, a height in the vehicle up-down direction may not be secured sufficiently on the rear side in the vehicle front-rear direction in comparison with a middle-floor vehicle.

Accordingly, in the present embodiment, as illustrated in FIG. 6, the floor panel 22 may be inclined upward when going from a front-part-25 side of the rocker 24 toward a floor-lower-cross-member-46 side. This makes it possible to widen a space with respect to grounding points of tires on the floor-lower-cross-member-46 side of the floor panel 22.

Accordingly, as illustrated in FIGS. 5A, 5B, and 6, it is possible to increase a height-direction dimension of the inner wall portion 42B and the outer wall portion 42C of the floor frame 42 on the floor-lower-cross-member-46 side of the rocker 24. That is, it is possible to increase a height-direction dimension of the closed section portion 48, thereby improving the rigidity of the floor frame 42, so that deformation of the floor frame 42 can be restrained.

Note that, in a case where a bonding strength between the floor frame 42 and the rocker 24 is secured sufficiently in the connection portion 70 (see FIG. 1), the floor panel 22 may not necessarily be inclined on the floor-upper-cross-member-34 side.

Further, by lengthening the height-direction dimension of the inner wall portion 42B and the outer wall portion 42C of the floor frame 42, it is possible to lengthen a length, in the up-down direction, of the outer flange portion 54B connected to the rocker inner panel 28 of the rocker 24. This accordingly makes it possible to improve the bonding strength between the floor frame 42 and the rocker 24.

Further, as illustrated in FIG. 1, inside the closed section portion 48 of the floor lower cross member 46, a reinforcing member 76 (indicated by a hatching in FIG. 6) may be provided between a rear end 47 of the floor frame 42 and a front end 74 of the rear side member 60. By providing the reinforcing member 76 inside the closed section portion 48 of the floor lower cross member 46 as such, the rigidity of the floor lower cross member 46 itself improves.

Figure 4:
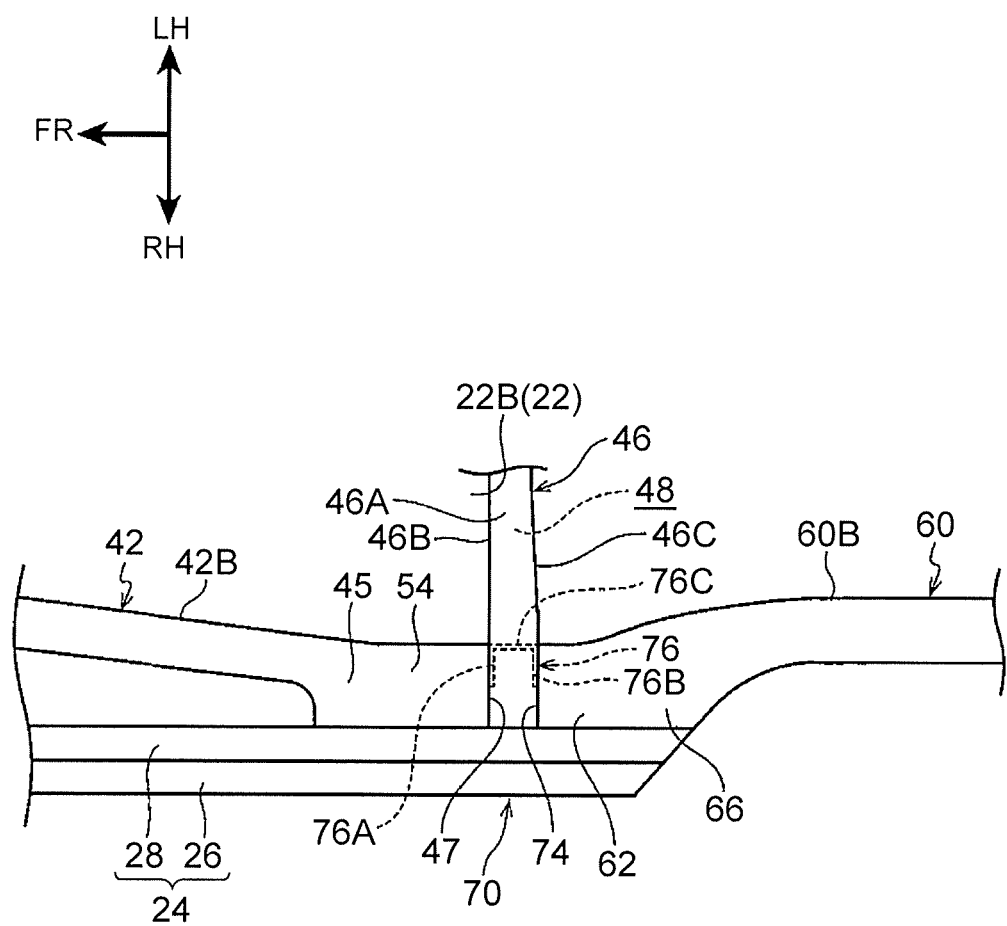
FIG. 4 is a partial enlarged plan view that enlarges a part of the vehicle framework structure according to the present embodiment.

Further, as illustrated in FIG. 4, the reinforcing member 76 has a generally hat shape having an opening on the outer side in the vehicle width direction in a plan view, and is constituted by a front wall portion 76A and a rear wall portion 76B opposed to each other, and a vertical wall portion 76C connecting respective inner ends of the front wall portion 76A and the rear wall portion 76B in the vehicle width direction. The front wall portion 76A and the rear wall portion 76B of the reinforcing member 76 are placed so as to abut with the front wall portion 46B and the rear wall portion 46C of the floor lower cross member 46, respectively.

Then, the vertical wall portion 76C of the reinforcing member 76 is provided between the inner wall portion 42B of the floor frame 42 and the inner wall portion 60B of the rear side member 60. That is, in a bottom view, the inner wall portion 42B of the floor frame 42, the vertical wall portion 76C of the reinforcing member 76, and the inner wall portion 60B of the rear side member 60 are formed continuously along the vehicle front-rear direction.

This makes it possible to reduce a load transfer loss of a collision load transmitted between the floor frame 42 and the rear side member 60 along the vehicle front-rear direction. In other words, it is possible to improve load transmission efficiency of the collision load.

Note that, in a case where the rigidity of the floor lower cross member 46 itself is secured sufficiently without providing the reinforcing member 76 inside the closed section portion 48 of the floor lower cross member 46, the reinforcing member 76 may not necessarily be provided. Accordingly, the inner wall portion 42B of the floor frame 42, the vertical wall portion 76C of the reinforcing member 76, and the inner wall portion 60B of the rear side member 60 may not necessarily be formed continuously along the vehicle front-rear direction.

(Supplementary Description of Present Embodiment) As illustrated in FIG. 1, the present embodiment deals with an example in which the floor lower cross member 46 is connected to the pair of rockers 24. However, the present embodiment is not limited to this as long as at least the rocker 24, the floor lower cross member 46, and the floor frame 42 are connected by the connection portion 70 at one place. For example, the floor frame 42 and the rear side member 60 may be connected to the rocker 24, the floor frame 42 and the rear side member 60 may be connected to each other, and the floor lower cross member 46 may be connected to this connection portion.

Further, the present embodiment makes an explanation with the torque box 50 being provided as an example of the cross member. However, the cross member is not limited to the torque box 50 as long as the cross member is disposed in the vehicle width direction and connected to the front part 43 of the floor frame 42 and the rocker 24. Further, as described above, the torque box 50 may not necessarily be provided as long as at least the rocker 24, the floor lower cross member 46, and the floor frame 42 are connected by the connection portion 70 at one place.

Further, in the present embodiment, the rocker 24 is constituted by a single member along the vehicle front-rear direction. However, for example, as illustrated in FIG. 7B, a rocker rear 71 may be connected, as another member, to a rear part, in the vehicle front-rear direction, of the connection portion 70 in the rocker 24. That is, in this case, the rocker rear 71 is integrated with the rocker 24 via the connection portion 70.

Further, in the present embodiment, as illustrated in FIG. 1, the widened portion 66 of the rear side member 60 and the widened portion 54 of the floor frame 42 are placed at the same position in the vehicle width direction, but may not necessarily be placed at the same position in the vehicle width direction. Further, in the present embodiment, the widened portion 54 is formed in the rear part 45 of the floor frame 42. However, the widened portion 54 may be provided such that another member as a widened portion is connected to the floor frame 42. Furthermore, the widened portion 54 may not necessarily be provided. Note that the rear side member 60 may be configured similarly to the floor frame 42.

Further, in the present embodiment, as illustrated in FIG. 6, the floor upper cross member 34 that forms the closed section portion 36 with the top face 22A of the floor panel 22 is disposed along the vehicle width direction, but the floor upper cross member 34 may not necessarily be provided.

An embodiment of the present disclosure has been explained as above, but it should be understood that the present disclosure is not limited to the above embodiment, and the embodiment and various modified embodiments may be employed in combination appropriately or the present disclosure may be performable in various aspects without departing from the scope of the present disclosure.

What is claimed is:

1. A vehicle framework structure comprising:
a tunnel disposed in a central part of a floor panel of a vehicle in a vehicle width direction so as to extend in a vehicle front-rear direction;
a pair of rockers disposed on respective outer sides of the floor panel in the vehicle width direction so as to extend in the vehicle front-rear direction;
a floor cross structure connected to a rear end of the tunnel and disposed along the vehicle width direction; and
a floor frame disposed between one of the rockers and the tunnel along the vehicle front-rear direction, a front end of the floor frame in the vehicle front-rear direction being connected to a front side structure provided in a vehicle front part so as to be disposed between the one of the rockers and the tunnel in the vehicle width direction and to extend along the vehicle front-rear direction, and a rear end of the floor frame in the vehicle front-rear direction being connected to the one of the rockers and the floor cross structure,
a rear side structure disposed on an outer side of a vehicle rear part in the vehicle width direction, the rear side structure extending in the vehicle front-rear direction, wherein a front part of the rear side structure in the vehicle front-rear direction and a rear part of the floor frame in the vehicle front-rear direction are placed at a same position in the vehicle width direction,
the floor frame and the rear side structure is connected to the one of the rockers, the floor frame and the rear side structure are connected to each other, and the floor cross structure is connected to this connection portion.

2. The vehicle framework structure according to claim 1, wherein the floor cross structure is a floor lower cross structure that forms a first closed section with a bottom face of the floor panel.

3. The vehicle framework structure according to claim 1, wherein the floor frame forms a second closed section with a bottom face of the floor panel.

4. The vehicle framework structure according to claim 1, wherein the rear side structure forms a third closed section with a bottom face of the floor panel.

5. The vehicle framework structure according to claim 1, wherein the connected portion overlaps with the floor cross structure in a vehicle side view.

6. The vehicle framework structure according to claim 1, further comprising:
a cross structure disposed along the vehicle width direction, the cross structure being connected to a front part of the floor frame in the vehicle front-rear direction and the one of the rockers, wherein
the floor frame is placed so as to be inclined outward in the vehicle width direction when going toward a rear side in the vehicle front-rear direction in a bottom view.

7. The vehicle framework structure according to claim 1, wherein
the rear side structure forms a third closed section with a bottom face of the floor panel and extends in the vehicle front-rear direction.

8. The vehicle framework structure according to claim 1, wherein
the floor panel is formed so as to be inclined upward in a vehicle up-down direction when going from a front side of the one of the rockers in the vehicle front-rear direction toward a floor-cross-structure side along the vehicle front-rear direction in a side view.

9. The vehicle framework structure according to claim 2, further comprising:
   a floor upper cross structure opposed to the floor lower cross structure with the floor panel being provided between the floor upper cross structure and the floor lower cross structure, the floor upper cross structure forming a fourth closed section with a top face of the floor panel so as to overlap with the first closed section of the floor lower cross structure in a vehicle up-down direction, the floor upper cross structure being disposed along the vehicle width direction so as to be connected to the pair of rockers.

10. The vehicle framework structure according to claim 1, wherein
   the rear part of the floor frame in the vehicle front-rear direction includes a widened structure including a width dimension along the vehicle width direction that is increased to be wider than another part of the floor frame in the vehicle front-rear direction;
   an outer flange is provided in an outer end of the widened structure in the vehicle width direction;
   the outer flange is connected to the one of the rockers;
   a rear flange is provided in a rear end of the widened structure in the vehicle front-rear direction; and
   the rear flange is connected to the floor cross structure.

* * * * *